US009856097B1

(12) United States Patent
Williams (10) Patent No.: US 9,856,097 B1
(45) Date of Patent: Jan. 2, 2018

(54) SYSTEM AND METHOD FOR INDUCING VIBRATION ON A STACK OF NON-FERROUS PANELS TO IMPROVE THE EASE DESTACKING THE PANELS

(71) Applicant: GM Global Technology Operations LLC, Detroit, MI (US)

(72) Inventor: Nikolas I. Williams, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/235,481

(22) Filed: Aug. 12, 2016

Related U.S. Application Data (60) Provisional application No. 62/348,233, filed on Jun. 10, 2016.

(51) Int. Cl.
*B32B 38/10* (2006.01)
*B65G 59/02* (2006.01)
*B32B 43/00* (2006.01)
*B65G 27/00* (2006.01)
*B65G 27/32* (2006.01)
*B65G 47/14* (2006.01)
*B65G 27/18* (2006.01)
*B65G 27/16* (2006.01)

(52) U.S. Cl.
CPC ............ *B65G 59/02* (2013.01); *B32B 43/006* (2013.01); *B32B 38/10* (2013.01); *B32B 2310/028* (2013.01); *B32B 2311/24* (2013.01); *B65G 27/00* (2013.01); *B65G 27/16* (2013.01); *B65G 27/18* (2013.01); *B65G 27/32* (2013.01); *B65G 47/1421* (2013.01); *B65G 2812/0312* (2013.01); *Y10T 156/1121* (2015.01); *Y10T 156/1922* (2015.01)

(58) Field of Classification Search
CPC . B32B 38/10; B32B 43/006; Y10T 156/1121; Y10T 156/1922; B65G 27/00; B65G 27/16; B65G 27/18; B65G 27/32; B65G 47/1421; B65G 2047/686; B65G 2812/0312; B65G 2814/0225
USPC .................................................. 156/705, 754
See application file for complete search history.

(56) References Cited

U.S. PATENT DOCUMENTS 2,562,247 A * 7/1951 Van Schie .............. B21D 43/24
414/794
2,567,223 A * 9/1951 Maher .................. B65G 59/062
271/102
3,401,446 A * 9/1968 Obeda ...................... C21D 9/46
156/705

(Continued)

OTHER PUBLICATIONS

Martin Vibration Systems & Solutions. "XHA™ Extra Hi-Amplitude Electric Vibrator". (n.d.). retrieved from http://www.shake-it.com/product-line/xha-extra-hi-amplitude-electric-vibrator/.

*Primary Examiner* — Mark A Osele
*Assistant Examiner* — Nickolas Harm (57) ABSTRACT

A system according to the principles of the present disclosure includes at least one bracket and at least one vibrator. The at least one bracket is configured to be mounted to a pallet adjacent to a stack of panels disposed on the pallet. The at least one vibrator is attached to the at least one bracket and configured to induce vibration on the stack of panels to disrupt an adhesive bond between adjacent panels in the stack of panels.

17 Claims, 5 Drawing Sheets

(56) References Cited

U.S. PATENT DOCUMENTS

| | | | | |
|---|---|---|---|---|
| 4,703,925 | A * | 11/1987 | Jelinek | B21D 43/24 271/103 |
| 4,967,948 | A * | 11/1990 | Allspaw | B27M 3/0073 227/152 |
| 5,314,058 | A * | 5/1994 | Graham | B65G 27/32 198/753 |
| 5,833,205 | A * | 11/1998 | Lindbeck | B65D 88/66 221/200 |
| 5,836,204 | A * | 11/1998 | Skak | B06B 1/14 198/766 |
| 6,179,547 | B1 * | 1/2001 | Hayakawa | B23Q 7/04 198/468.4 |
| 6,257,543 | B1 * | 7/2001 | Huelsmann | B06B 1/00 248/638 |
| 6,349,817 | B1 * | 2/2002 | Wadensten | B65G 27/32 198/763 |
| 6,686,598 | B1 * | 2/2004 | Walther | H01L 21/68721 250/443.1 |
| 2007/0062643 | A1 * | 3/2007 | Watanabe | B29C 65/5057 156/705 |
| 2009/0277591 | A1 * | 11/2009 | Zhao | G11B 5/102 156/703 |
| 2013/0032297 | A1 * | 2/2013 | Coto | B32B 43/006 156/705 |
| 2014/0041987 | A1 * | 2/2014 | Kimura | B65G 27/24 198/348 |

* cited by examiner

SYSTEM AND METHOD FOR INDUCING VIBRATION ON A STACK OF NON-FERROUS PANELS TO IMPROVE THE EASE DESTACKING THE PANELS

CROSS-REFERENCE TO RELATED APPLICATIONS

This application claims the benefit of U.S. Provisional Application No. 62/348,233, filed on Jun. 10, 2016. The disclosure of the above application is incorporated herein by reference in its entirety.

FIELD

The present disclosure relates to systems and methods for inducing vibration on a stack of non-ferrous panels to improve the ease of destacking the panels.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Stacks of various blanks or panels are provided to an assembly plant for use on a vehicle. In one example, the panels are vehicle body panels such as a hood panel. The panels are separated from the stack one at a time so that each panel may be used in the manufacturing process. However, mill oil that is used when the panels are produced may form an adhesive bond between adjacent panels, making it difficult to separate each panel from the stack.

Air knives are used to force air between adjacent panels in an attempt to break an adhesive bond between the panels. However, depending on the strength of the adhesive bond, forcing air between the adjacent panels may not be adequate to break the adhesive bond. If the panels are made of a ferrous material such as steel, a magnet may be used to fan the edges of the panels and thereby break adhesive bonds between adjacent panels. However, if the panels are made of a non-ferrous material such as aluminum, using a magnet to fan the edges of the panels is unlikely to break adhesive bonds between adjacent panels. Therefore, a need exists for a system and method for improving the ease of destacking non-ferrous panels.

SUMMARY

A system according to the principles of the present disclosure includes at least one bracket and at least one vibrator. The at least one bracket is configured to be mounted to a pallet adjacent to a stack of panels disposed on the pallet. The at least one vibrator is attached to the at least one bracket and configured to induce vibration on the stack of panels to disrupt an adhesive bond between adjacent panels in the stack of panels.

A method according to the principles of the present disclosure includes securing at least one bracket to a pallet adjacent to a stack of panels disposed on the pallet. The method further includes supplying power to at least one vibrator mounted to the at least one bracket to induce vibration on the stack of panels to disrupt an adhesive bond between adjacent panels in the stack of panels.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system and method according to the present disclosure induces vibration on a stack of panels to break adhesive bonds between adjacent ones of the panels and thereby improve the ease of destacking the panels. In contrast to using a magnet to fan the edges of the panels, inducing vibration on a stack of panels may be used to break adhesive bonds between adjacent ones of the panels regardless of whether the panels are ferrous or non-ferrous. In addition, the system is configured to mount to a pallet on which the panels are shipped so that the method may be performed without removing the panels from the pallet, which saves labor time and costs.

Figure 1:
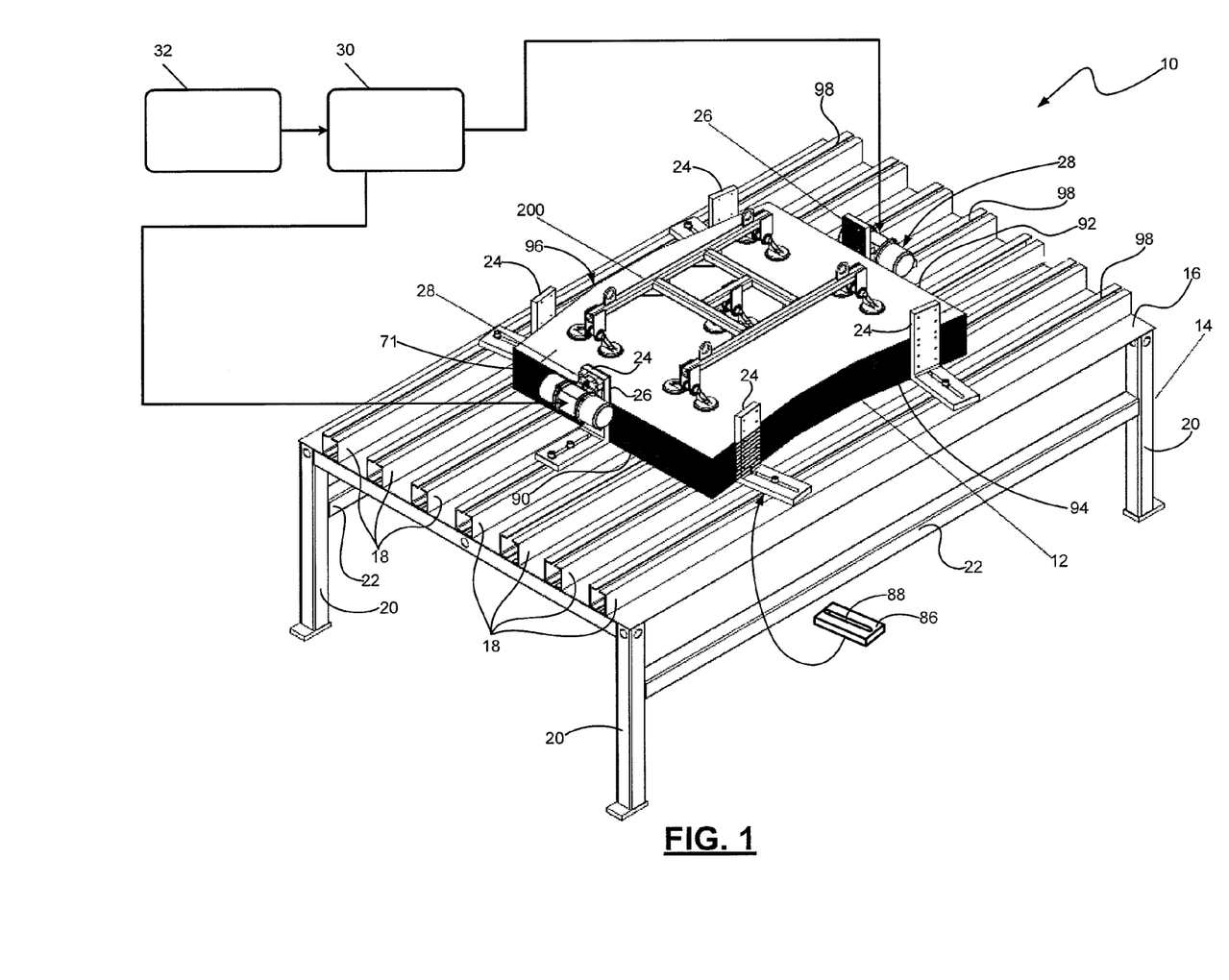
FIG. 1 is a perspective view of a stack of panels disposed on a pallet and an example system for inducing vibration on the stack to improve the ease of destacking the panels according to the present disclosure.

Referring now to FIG. 1, a system 10 induces vibration on a stack of panels 12 disposed on a pallet 14 to break adhesive bonds between adjacent ones of the panels 12 and thereby improve the ease of destacking the panels 12. The panels 12 may be made of a non-ferrous material (e.g., aluminum) and may be vehicle body panels such as hood panels. The panels 12 are placed on the pallet 14 and then shipped to an assembly plant (not shown). The pallet 14 includes a floor 16 and a plurality of C-channels 18 secured to the floor 16. In the example shown, the pallet 14 further includes legs 20 and crossbeams 22 extending between the legs 20. However, the pallet 14 may not include the legs 20 and the crossbeams 22.

The system 10 includes a plurality of L-shaped brackets 24, a pair of face plates 26 mounted to two of the brackets 24, a pair of vibrators 28 mounted to two of the brackets 24, a power supply 30, and a control module 32. The L-shaped brackets 24 may be made of hot rolled steel, and the face plates 26 may be made of cold rolled steel. With additional reference to FIGS. 2-6, each of the L-shaped brackets 24 includes a base plate 34 and an upright plate 36 oriented perpendicular to the base plate 34. The base plate 34 has a bottom surface 38 configured to rest on the pallet 14 and a top surface 40 opposite of the bottom surface 38, and the base plate 34 defines a slot 42 extending through the bottom and top surfaces 38 and 40. The slot 42 is configured to receive fasteners 44 for securing the L-shaped brackets 24 to the C-channels 18 on the pallet 14. Each of the fasteners 44 includes a head 46 and a threaded shank 48.

The upright plate 36 has a front side 50 configured to face the stack of the panels 12 and a back side 52 opposite of the front side 50, and the upright plate 36 defines a plurality of holes 54 extending through the front and back sides 50 and 52. The holes 54 are configured to receive fasteners 56 for attaching the vibrators 28 to the L-shaped brackets 24. The holes 54 are threaded, and each of the fasteners 56 includes a head 58 and a threaded shank 60 configured to threadingly engage the holes 54. While only four of the fasteners 56 may be used to attach the vibrators 28 to the L-shaped brackets 24, the upright plate 36 more than four (e.g., twelve) of the holes 54 so that the vibrators 28 may be attached to the L-shaped brackets 24 at different heights.

The upright plate 36 also defines a plurality of holes 62 that extend through the front side 50 of the upright plate 36 but do not extend through the back side 52 of the upright plate 36. The holes 62 are configured to receive fasteners 64 for attaching the face plates 26 to the L-shaped brackets 24. The holes 62 are threaded, and each of the fasteners 64 includes a head 66 and a threaded shank 68 configured to threadingly engage the holes 62.

Referring now to FIGS. 2 and 7-9, each of the face plates 26 has a front surface 70 configured to engage edges 71 of the panels 12 and a back surface 72 opposite of the front surface 70. Each of the face plates 26 defines a plurality of holes 74 extending through the front and back surfaces 70 and 72. The holes 74 are configured to receive the fasteners 64 that attach the face plates 26 to the L-shaped brackets 24. The holes 74 may be countersunk as shown so that the head 66 of each of the fasteners 56 is recessed relative to the front surface 70. In addition, the holes 74 may be unthreaded.

Figure 7:
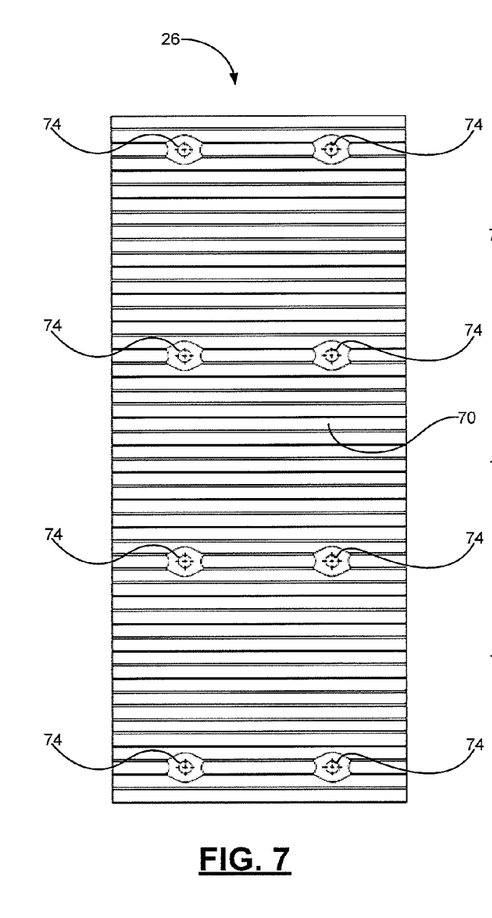
FIG. 7 is a front view of the face plate.
Figure 8:
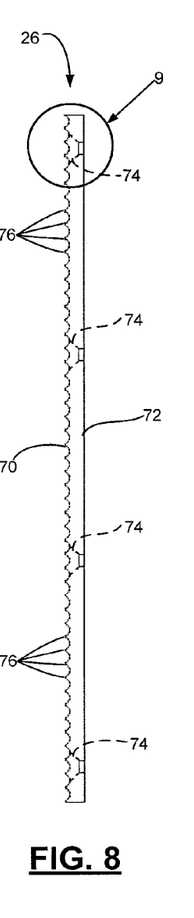
FIG. 8 is a side view of the face plate.
Figure 9:
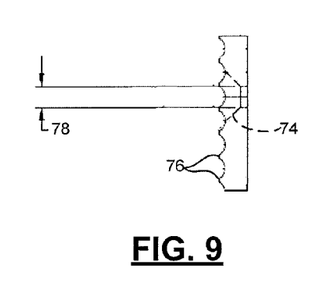
FIG. 9 is an enlarged view of a portion of the face plate within circle 9 of FIG. 8.

The front surface 70 of each of the face plates 26 includes a plurality of ribs or serrations 76. The serrations 76 may catch or grab the edges 71 of the panels 12 as the vibrators 28 vibrate the stack of the panels 12, which may increase the amount by which the vibration breaks adhesive bonds between the panels 12. The serrations 76 may be spaced apart by a distance 78 from 0.2 millimeters (mm) to 1.6 mm.

Figure 2:
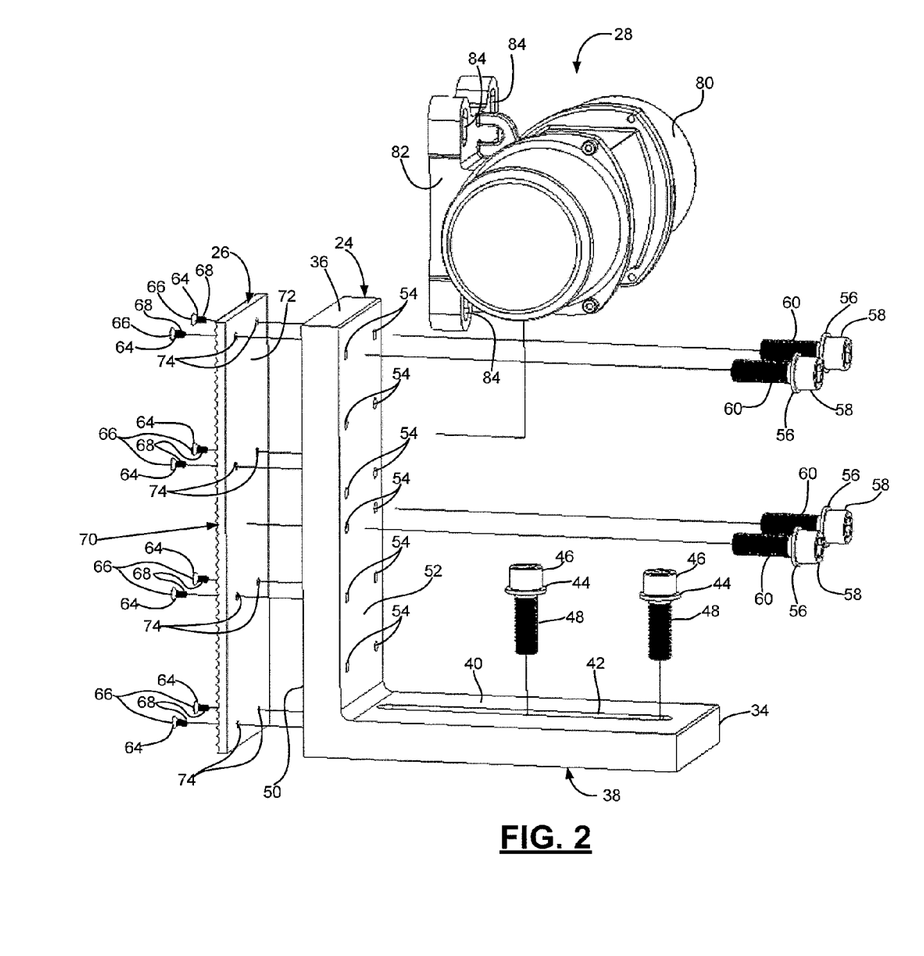
FIG. 2 is an exploded perspective view of an L-shaped bracket, a face plate, a vibrator, and fasteners included in the system of FIG. 1.
Figures 3, 5:
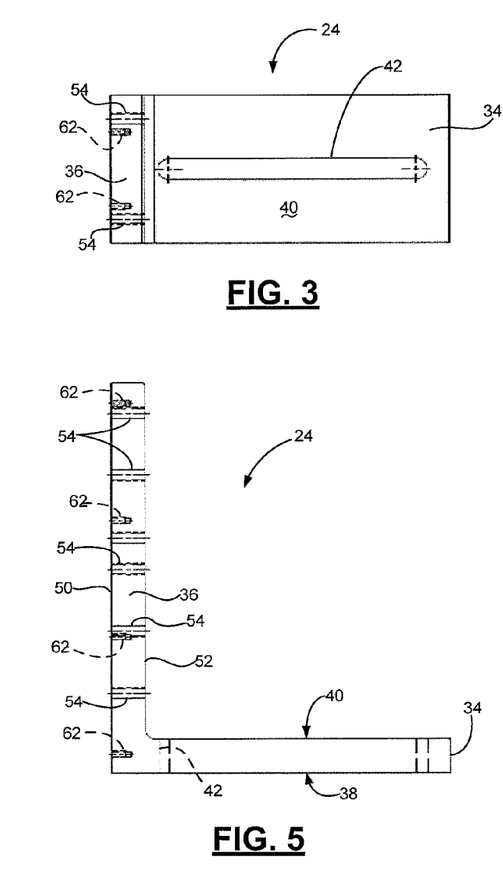
FIG. 3 is a top view of the L-shaped bracket.
FIG. 5 is a side view of the L-shaped bracket.
Figure 4:
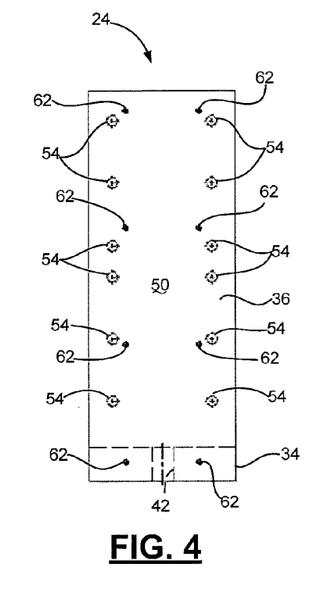
FIG. 4 is a front view of the L-shaped bracket.
Figure 6:
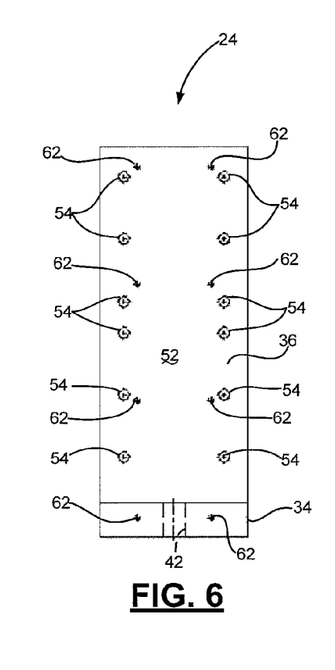
FIG. 6 is a rear view of the L-shaped bracket.

Referring now to FIGS. 1 and 2, the vibrators 28 are configured to vibrate the stack of the panels 12 when power is supplied to the vibrators 28. Each of the vibrators 28 may be a heavy duty industrial vibrator such as a MARTIN® XHA™ Extra Hi-Amplitude Electric Vibrator. Each of the vibrators 28 includes a cylindrical vibrating body 80 and a mounting bracket 82 for mounting the vibrators 28 to the L-shaped brackets 24. The mounting bracket 82 defines unthreaded through holes 84 that are configured to receive the fasteners 56 that attach the vibrators 28 to the L-shaped brackets 24.

The power supply 30 supplies power to the vibrators 28. The control module 32 controls the power supply 30 to adjust the amount of power supplied to the vibrators 28. In various implementations, the control module 32 may be omitted, and the amount of power supplied by the power supply 30 may be manually controlled.

In various implementations, the system 10 may further include one or more vibration dampening pads 86. The vibration dampening pads 86 may be mounted between the L-shaped brackets 24 and the C-channels 18 on the pallet 14 to dampen vibration induced on the pallet 14. The vibration dampening pads 86 may be mounted underneath all of the L-shaped brackets 24, or the vibration dampening pads 86 may be mounted underneath only those of the L-shaped brackets 24 to which the vibrators 28 are attached. The vibration dampening pads 86 may be made of a vibration dampening material such as rubber. Each of the vibration dampening pads 86 includes a hole or slot 88 for receiving the fasteners 44 that secure the L-shaped brackets 24 to the C-channels 18.

Figure 10:
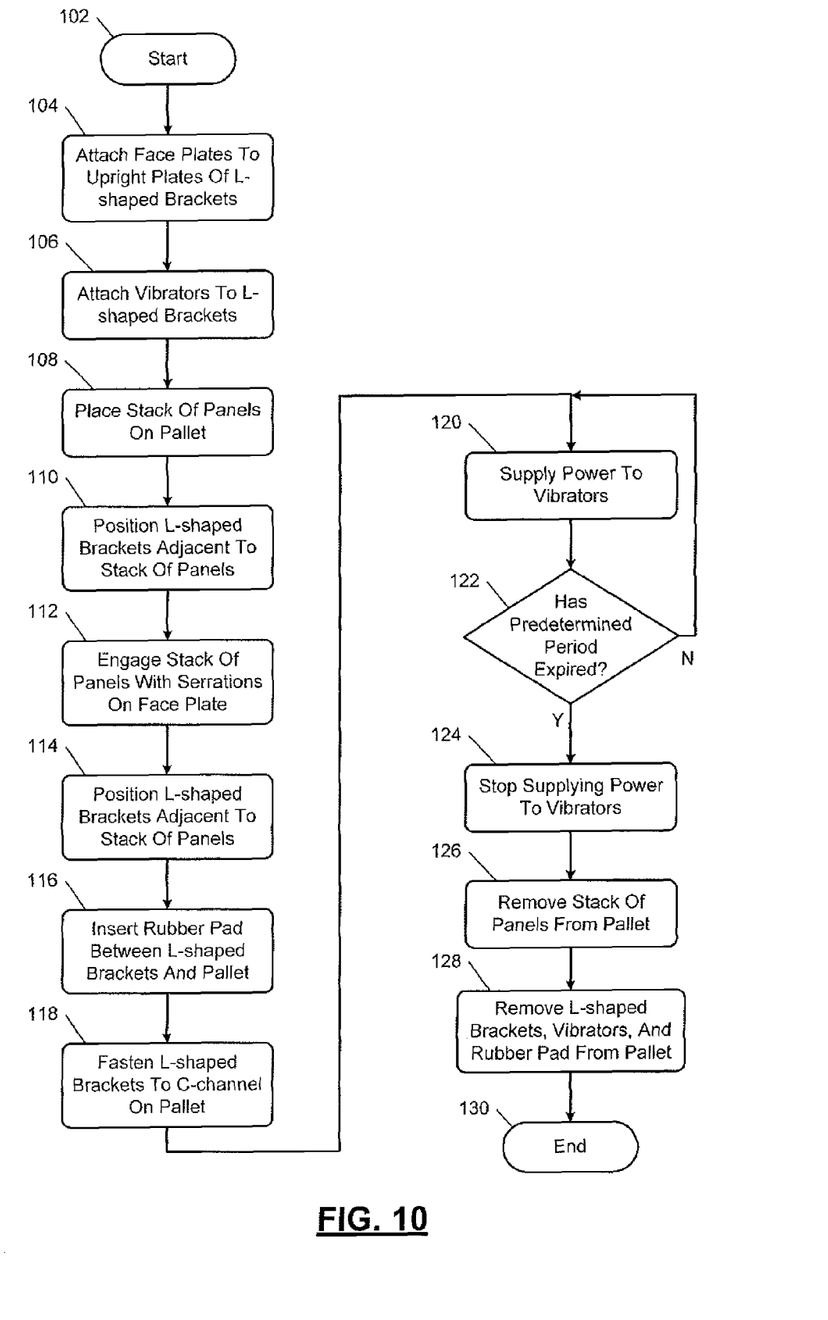
FIG. 10 is a flowchart illustrating an example method for inducing vibration on a stack of non-ferrous panels to improve the ease of destacking the panels according to the present disclosure.

Referring now to FIGS. 1, 2, and 10, a method for inducing vibration on the stack of the panels 12 to improve the ease of destacking the panels 12 begins at 102. At 104, an assembler attaches the face plates 26 to the upright plates 36 of the L-shaped brackets 24. The assembler does this by placing the back surface 72 of the face plates 26 against the front side 50 of the upright plates 36, inserting the fasteners 64 through the holes 74 in the face plates 26, and threading the fasteners 64 into the holes 62 in the upright plates 36.

At 106, the assembler attaches the vibrators 28 to one or more (e.g., two) of the L-shaped brackets 24. The assembler may attach the vibrators 28 to the L-shaped brackets 24 at different heights by aligning the holes 84 in the mounting bracket 82 of the vibrators 28 with different ones of the holes 54 in the upright plates 36 of the L-shaped brackets 24. In the example shown, the vibrators 28 may be attached to the L-shaped brackets 24 at four different heights relative to the bottom surface 38 of the base plate 34.

At 108, the assembler places the stack of the panels 12 on the pallet 14. As discussed above, the stack of the panels 12 may be placed on the pallet 14 before the panels 12 are shipped to the assembly plant. At 110, the assembler positions one of the L-shaped brackets 24 at a first end 90 of the stack of the panels 12, and positions another one of the L-shaped brackets 24 at a second end 92 of the stack of the panels 12 that is opposite of the first end 90. The L-shaped brackets 24 that are positioned at the first and second ends 90 an 92 may be the only ones of the L-shaped brackets 24 to which the vibrators 28 are attached.

At 112, the assembler engages the edges 71 of the panels 12 with the serrations 76 on the front surface 70 of the face plates 26 attached to the L-shaped brackets 24. The face plates 26 may only be attached to the L-shaped brackets 24 that are positioned at the first and second ends 90 and 92 of the stack of the panels 12. At 114, the assembler positions four of the L-shaped brackets 24 on opposite sides of the stack of the panels 12 that extend between the first and second ends 90 and 92. In the example shown, the assembler positions two of the L-shaped brackets 24 on a first side 94 of the stack, and the assembler positions two of the L-shaped brackets 24 on a second side 96 of the stack that is opposite of the first side 94.

At 116, the assembler inserts the vibration dampening pads 86 between the L-shaped brackets 24 and the C-channels 18 on the pallet 14. At 118, the assembler fastens the L-shaped brackets 24 to the C-channels 18. The assembler does this by inserting the fasteners 44 through the slot 42 in the L-shaped brackets 24, the slot 88 in the vibration dampening pads 86, and a slot 98 in the C-channels 18, and threading a nut (not shown) onto the threaded shank 48 of the fasteners 44.

At 120, the control module 32 controls the power supply 30 to supply power to the vibrators 28. The control module 32 may control the power supply 30 to adjust the amount of power supplied to the vibrators 28 and thereby adjust the amplitude of vibration induced on the stack of the panels 12.

The control module 32 may control the power supply 30 to supply different amounts of power to different ones of the vibrators 28. For example, a first amount of power may be supplied to the one of the vibrators 28 positioned at the first end 90 of the stack, and a second, different amount of power may be supplied to the one of the vibrators 28 positioned at the second end 92 of the stack.

The control module 32 may control the power supply 30 to operate the vibrators 28 out of phase. In one example, the control module 32 operates the vibrators 28 at the same amplitude and frequency. However, one of the vibrators 28 reaches its peak amplitude at a first time, and the other one of the vibrators 28 reaches its peak amplitude at a second time that is different than the first time.

At 122, the control module 32 determines whether a predetermined period (e.g., 5 minutes) has elapsed. If the predetermined period has elapsed, the method continues at 124. Otherwise, the method returns to 120.

At 124, the control module 32 controls the power supply 30 to stop supplying power to the vibrators 28. At 126, the assembler removes the stack of the panels 12 from the pallet 14. The assembler may separate one of the panels 12 from the remainder of the stack using a suction cup lifter 200. At 128, the assembler removes the L-shaped brackets 24, the vibrators 28, and the dampening pads 86 from the pallet 14. The assembler may leave the vibrators 28 attached to the L-shaped brackets 24 so when removing the L-shaped brackets 24 from the pallet 14 to improve the ease of reassembling the vibrators 28 to the pallet 14 to induce vibration on another stack of panels. The method ends at 130.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
   at least one bracket configured to be mounted to a pallet adjacent to a stack of panels disposed on the pallet, the at least one bracket including a pair of first brackets disposed at opposite ends of the stack of panels; and
   at least one vibrator attached to the at least one bracket and configured to induce vibration on the stack of panels to disrupt an adhesive bond between adjacent panels in the stack of panels, and the at least one vibrator including a pair of vibrators that are each mounted to one of the first brackets, wherein the pair of vibrators includes:
      a first vibrator that is mounted to one of the first brackets at a first height; and
      a second vibrator that is mount to another one of the first brackets at a second height that is different than the first height.

2. The system of claim 1 wherein the at least one bracket further includes a plurality of second brackets that are configured to engage opposite sides of the stack of panels that extend between the opposite ends thereof.

3. The system of claim 2 wherein the second brackets are L-shaped.

4. The system of claim 1 wherein the first brackets are L-shaped.

5. A system comprising:
   at least one bracket configured to be mounted to a pallet adjacent to a stack of panels disposed on the pallet; and
   at least one vibrator attached to the at least one bracket and configured to induce vibration on the stack of panels to disrupt an adhesive bond between adjacent panels in the stack of panels, wherein the at least one bracket includes an L-shaped bracket, the L-shaped bracket including a base plate and an upright plate, the upright plate having a front side and a back side, the front side being configured to face the stack of panels, the at least one vibrator being mounted to the back side of the upright plate.

6. The system of claim 5 further comprising a face plate mounted to the front side of the upright plate of the L-shaped bracket and configured to engage the stack of panels.

7. The system of claim 6 wherein the face plate has a front surface configured to engage the stack of panels and including a plurality of serrations.

8. The system of claim 5 wherein the base plate of the L-shape bracket defines a slot that is configured to receive a fastener for fixing the L-shaped bracket to a C-channel on the pallet.

9. The system of claim 5 further comprising a power supply that supplies power to the at least one vibrator.

10. The system of claim 9 further comprising a control module that controls the power supply to adjust the amount of power supplied to the at least one vibrator.

11. A system comprising:
    at least one bracket configured to be mounted to a pallet adjacent to a stack of panels disposed on the pallet;
    at least one vibrator attached to the at least one bracket and configured to induce vibration on the stack of panels to disrupt an adhesive bond between adjacent panels in the stack of panels; and
    a vibration dampening pad configured to be mounted between the at least one bracket and the pallet to dampen vibration induced on the pallet.

12. A method comprising:
    securing at least one bracket to a pallet adjacent to a stack of panels disposed on the pallet;
    supplying power to at least one vibrator mounted to the at least one bracket to induce vibration on the stack of panels to disrupt an adhesive bond between adjacent panels in the stack of panels;
    securing a first bracket to the pallet at a first end of the stack of panels;
    securing a second bracket to the pallet at a second end of the stack of panels that is opposite of the first end, wherein the at least one vibrator includes a first vibrator mounted to the first bracket and a second vibrator mounted to the second bracket;
    supplying a first amount of power to the first vibrator; and
    supplying a second amount of power to the second vibrator, wherein the second amount of power is different than the first amount of power.

13. The method of claim 12 further comprising:
    mounting the first vibrator to the first bracket at a first height relative to a bottom surface of the first bracket; and
    mounting the second vibrator to the second bracket at a second height relative to a bottom surface of the second bracket, wherein the second height is different than the first height.

14. The method of claim 12 wherein the at least one bracket includes an L-shape bracket, the L-shaped bracket including a base plate and an upright plate, the upright plate having a front side and a back side, the method further comprising mounting a face plate to the front side of the upright plate.

15. The method of claim 14 further comprising:
    fastening the base plate to a C-channel on the pallet; and
    engaging the stack of panels with a plurality of serrations disposed on a front surface of the face plate.

16. The method of claim 12 further comprising mounting a vibration dampening pad between the at least one bracket and the pallet to dampen vibration induced on the pallet.

17. A method comprising:
    securing at least one bracket to a pallet adjacent to a stack of panels disposed on the pallet;
    supplying power to at least one vibrator mounted to the at least one bracket to induce vibration on the stack of panels to disrupt an adhesive bond between adjacent panels in the stack of panels;
    securing a first bracket to the pallet at a first end of the stack of panels;
    securing a second bracket to the pallet at a second end of the stack of panels that is opposite of the first end, wherein the at least one vibrator includes a first vibrator mounted to the first bracket and a second vibrator mounted to the second bracket; and
    operating the first and second vibrators out of phase.

* * * * *